United States Patent
Yang

(10) Patent No.: US 12,309,857 B2
(45) Date of Patent: May 20, 2025

(54) SESSION INFORMATION PROCESSING METHOD, AND ELECTRONIC DEVICE

(71) Applicant: VIVO MOBILE COMMUNICATION CO., LTD., Dongguan (CN)

(72) Inventor: Lei Yang, Dongguan (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 372 days.

(21) Appl. No.: 17/891,555

(22) Filed: Aug. 19, 2022

(65) Prior Publication Data

US 2022/0394786 A1      Dec. 8, 2022

Related U.S. Application Data

(63) Continuation of application No. PCT/CN2021/076699, filed on Feb. 18, 2021.

(30) Foreign Application Priority Data

Feb. 25, 2020 (CN) .......................... 202010114893.8

(51) Int. Cl.
*H04W 4/12* (2009.01)
*H04W 8/18* (2009.01)
*H04W 76/11* (2018.01)
*H04W 80/10* (2009.01)

(52) U.S. Cl.
CPC ............ *H04W 76/11* (2018.02); *H04W 8/183* (2013.01); *H04W 80/10* (2013.01)

(58) Field of Classification Search
CPC ................................ H04W 76/11; H04W 4/12
See application file for complete search history.

(56) References Cited

U.S. PATENT DOCUMENTS

| | | | |
|---|---|---|---|
| 9,154,601 | B2 | 10/2015 | He et al. |
| 2014/0024428 | A1 | 1/2014 | Solomon et al. |
| 2015/0018040 | A1* | 1/2015 | He .......................... G06F 21/34 455/558 |

(Continued)

FOREIGN PATENT DOCUMENTS

| | | |
|---|---|---|
| CN | 101119383 A | 2/2008 |
| CN | 101282544 A | 10/2008 |

(Continued)

OTHER PUBLICATIONS

Anonymous, "4.1 jelly bean—Not able to know to which SIM sms was received", Android Enthusiasts Stack Exchange, Feb. 4, 2016, pp. 1-2, XP093052421, https://web.archive.org/web/20160204182158/https://android.stackexchange.com/questions/47267/not-able-to-know-to-which-sim-sms-was-received.

*Primary Examiner* — Barry W Taylor
(74) *Attorney, Agent, or Firm* — The Webb Law Firm

(57) ABSTRACT

A session information processing method includes receiving first information sent by a second electronic device to a target SIM card account of the first electronic device based on a first SIM card account, where the first information carries identifier information of the second electronic device; and in a case that the first electronic device includes a second SIM card account associated with the identifier information, adding the first information to a target session. Session objects of the target session include the first SIM card account, the second SIM card account, and the target SIM card account.

12 Claims, 2 Drawing Sheets

(56) References Cited

U.S. PATENT DOCUMENTS

| | | | | |
|---|---|---|---|---|
| 2015/0105054 A1* | 4/2015 | Chuang | ................... | H04L 51/48 |
| | | | | 455/412.2 |
| 2015/0245186 A1* | 8/2015 | Park | ....................... | H04W 4/16 |
| | | | | 455/417 |
| 2015/0358787 A1* | 12/2015 | Huang | .................... | H04W 4/14 |
| | | | | 455/466 |
| 2016/0105781 A1 | 4/2016 | Wells | | |
| 2016/0227019 A1* | 8/2016 | Seol | .................. | H04M 1/72436 |

FOREIGN PATENT DOCUMENTS

| | | | |
|---|---|---|---|
| CN | 103002101 | A | 3/2013 |
| CN | 103561155 | A | 2/2014 |
| CN | 104113468 | A | 10/2014 |
| CN | 105049340 | A | 11/2015 |
| CN | 105208085 | A | 12/2015 |
| CN | 105409250 | A | 3/2016 |
| CN | 105426032 | A | 3/2016 |
| CN | 105847555 | A | 8/2016 |
| CN | 105872221 | A | 8/2016 |
| CN | 109951305 | A | 6/2019 |
| CN | 110572782 | A | 12/2019 |
| CN | 110620846 | A | 12/2019 |
| CN | 110691027 | A | 1/2020 |
| CN | 111343591 | A | 6/2020 |

* cited by examiner

SESSION INFORMATION PROCESSING METHOD, AND ELECTRONIC DEVICE

CROSS-REFERENCE TO RELATED APPLICATIONS

This application is a Bypass Continuation Application of PCT/CN2021/076699 filed Feb. 18, 2021, and claims priority to Chinese Patent Application No. 202010114893.8 filed Feb. 25, 2020, the disclosures of which are hereby incorporated by reference in their entirety.

BACKGROUND OF THE INVENTION

Field of the Invention

The present invention relates to the field of communication technologies, and in particular, to a session information processing method and an electronic device.

Description of Related Art

With the development of communication technology, a subscriber identity module (SIM) card can be used to not only send short messages through an operator, but also send network short messages, which improves chatting experience of a user.

Currently, in the process of using the SIM card for instant messaging, information is received and sent from an account to another account, and on an information display interface of a receive end, each SIM card account is corresponding to one session. However, when a transmit end has at least two SIM card accounts, and both of the accounts are used to send information to the receive end, the receive end may generate a plurality of sessions to display the information sent by the transmit end based on different SIM card accounts. In this way, a quantity of sessions at the receive end may be increased, thereby affecting the effect for the user at the receive end to view the information.

SUMMARY OF THE INVENTION

According to a first aspect, an embodiment of the present invention provides a session information processing method, applied to a first electronic device and including:
  receiving first information sent by a second electronic device to a target SIM card account of the first electronic device based on a first SIM card account, where the first information carries identifier information of the second electronic device; and
  in a case that the first electronic device includes a second SIM card account associated with the identifier information, adding the first information to a target session, where session objects of the target session include the first SIM card account, the second SIM card account, and the target SIM card account.

According to a second aspect, an embodiment of the present invention further provides an electronic device, where the electronic device is a first electronic device and includes:
  a first receiving module, configured to receive first information sent by a second electronic device to a target SIM card account of the first electronic device based on a first SIM card account, where the first information carries identifier information of the second electronic device; and
  a first adding module, configured to add, in a case that the first electronic device includes a second SIM card account associated with the identifier information, the first information to a target session, where session objects of the target session include the first SIM card account, the second SIM card account, and the target SIM card account.

According to a third aspect, an embodiment of the present invention further provides an electronic device, where the electronic device is a first electronic device and includes a processor, a memory, and a computer program stored in the memory and executable on the processor, and when the computer program is executed by the processor, steps of the session information processing method are implemented.

According to a fourth aspect, an embodiment of the present invention further provides a non-transitory computer-readable storage medium, where the non-transitory computer-readable storage medium stores a computer program, and when the computer program is executed by a processor, steps of the session information processing method are implemented.

BRIEF DESCRIPTION OF DRAWINGS

To describe the technical solutions in the embodiments of the present invention more clearly, the following briefly describes the accompanying drawings required for describing the embodiments of the present invention. Apparently, the accompanying drawings in the following description show merely some embodiments of the present invention, and a person of ordinary skill in the art may still derive other drawings from these accompanying drawings without creative efforts.

DESCRIPTION OF THE INVENTION

The following clearly and completely describes the technical solutions in the embodiments of the present invention with reference to the accompanying drawings in the embodiments of the present invention. Apparently, the described embodiments are some rather than all of the embodiments of the present invention. All other embodiments obtained by a person of ordinary skill in the art based on the embodiments of the present invention shall fall within the protection scope of the present invention.

Figure 1:
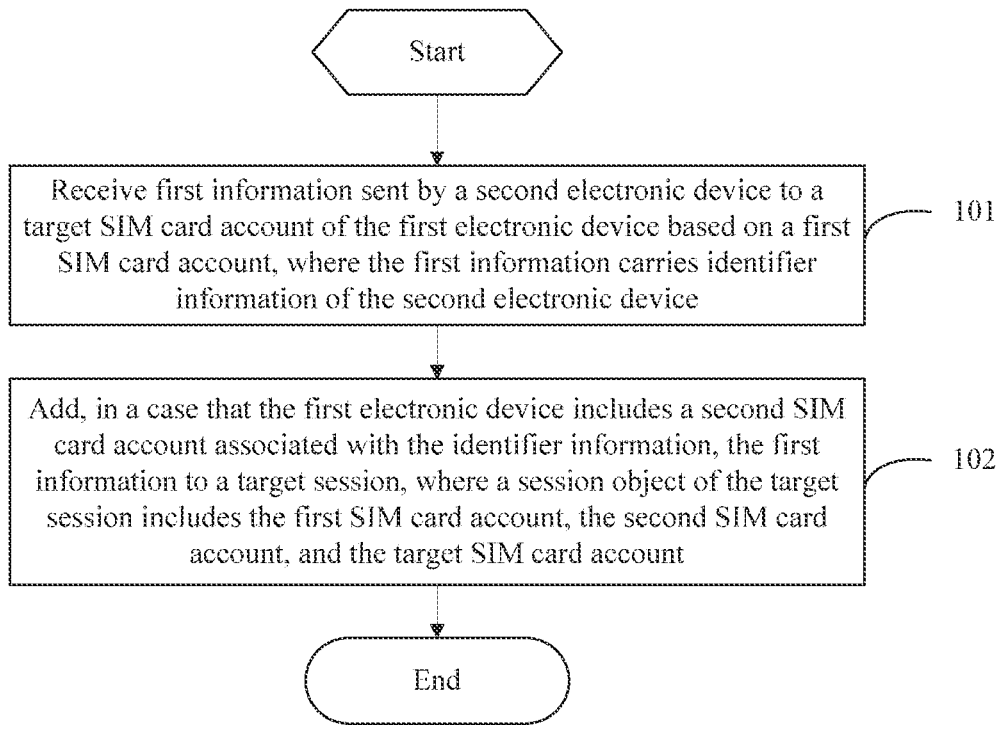
FIG. 1 is a flowchart of a session information processing method according to an embodiment of the present invention.

As shown in FIG. 1, an embodiment of the present invention provides a session information processing method, where the method is applied to a first electronic device and includes the following steps.

Step 101. Receive first information sent by a second electronic device to a target SIM card account of the first electronic device based on a first SIM card account, where the first information carries identifier information of the second electronic device.

This step is for the process of realizing information exchange between two electronic devices through the SIM card account, for example, sending and receiving short messages through the SIM card account, or sending and receiving short and multimedia messages through the SIM card account.

A unique matching relationship may be established among an SIM card account, an SIM card identifier, and identifier information of an electronic device into which the card is inserted.

For example, as for the first SIM card of the second electronic device, a unique matching relationship may be established among an account of the first SIM card, an identifier of the first SIM card, and identifier information of the second electronic device; and similarly, as for the target SIM card of the first electronic device, a unique matching relationship may also be established among an account of the target SIM card, an identifier of the target SIM card, and identifier information of the first electronic device.

Information interaction between the first electronic device and the second electronic device is achieved through a server. For example, when sending a message to the first electronic device, the second electronic device first sends the message to the server. The server finds the first electronic device based on the matching relationship among the account of the first SIM card, the identifier of the first SIM card, and the identifier information of the second electronic device, and then sends the information to the first electronic device, thereby realizing information transmission.

Step 102. Add, in a case that the first electronic device includes a second SIM card account associated with the identifier information, the first information to a target session, where a session object of the target session includes the first SIM card account, the second SIM card account, and the target SIM card account.

In this step, that the second SIM card account is associated with the identifier information of the second electronic device may be represented as a unique matching relationship between the second SIM card account and the identifier information of the second electronic device, that is, the second SIM card account is also an SIM card account belonging to the second electronic device, that is, the second electronic device is a dual-SIM dual-standby electronic device or a multi-SIM multi-standby electronic device.

The second SIM card account may be an account in an address book of the first electronic device, or an account that has a communication record with the first electronic device but is not stored in the address book, or may also be an account stored in a specific piece of information of the target SIM card account.

In a case that the address book of the target SIM card account includes the second SIM card account, the received first information may be added to the target session, where the session object of the target session includes the first SIM card account, the second SIM card account, and the target SIM card account, thereby enhancing interaction between users, as well as interaction between electronic devices, and downplaying the concept of the SIM card account. In the process of information exchange between the target SIM card account and the SIM card account associated with the identifier information of the second electronic device, the target SIM card account, the first SIM card account, and the second SIM card account are used to form a target session, and compared with that the target SIM card account is used to form sessions with each SIM card account associated with the identifier information of the second electronic device, a quantity of sessions of the first electronic device may be effectively reduced, and the effect for the user to view the information on the first electronic device is optimized.

For example, the second electronic device is a dual-SIM dual-standby device, and includes two SIM card accounts: XX000000001 and XX000000002, and the SIM card account of the first electronic device is XX100000001; the first electronic device may combine information sent by XX000000001 and XX000000002 to XX100000001 into one session, that is, in an information display interface of this session, both information sent by XX000000001 and information sent by XX000000002 may be displayed; and compared with establishing a session between XX100000001 and XX000000001, as well as a session between XX100000001 and XX000000002, a quantity of sessions may be effectively reduced, the effect to view the message is optimized, and the concept of the SIM card account is downplayed.

Optionally, the adding the first information to the target session includes: in a case that session records of the first electronic device include session records of the target SIM card account and the second SIM card account, adding the first SIM card account to the session records of the target SIM card account and the second SIM card account, so as to generate the target session; and adding the first information to the target session.

In this embodiment, if there is already a session record between the target SIM card account and the second SIM card account, the first information may be added to the session record to emphasize interaction between devices and downplay the concept of the SIM card account.

For example, if a user A sends the first information to the target SIM card account of the first electronic device of a user B through the first SIM card account of the second electronic device, and there are session records of the target SIM card account and session records of the second SIM card account on the second electronic device, the first SIM card account is added to the session object of the session records, thereby downplaying the concept of the SIM card account, and increasing the interaction effect between the user A and the user B.

If there is no session record of the second SIM card account and the target SIM card account on the first electronic device, the first information may also be added to the target session, so that when information interaction is required to be performed between the second SIM card account and the target SIM card account, interaction information thereof may be directly added to the target session, thereby reducing the quantity of sessions and improving the effect to view the information.

Optionally, after the adding the first information to the target session, the method further includes: receiving a first input for the target session; and displaying an information display interface of the target session in response to the first input, where a first identifier is displayed in a first area in which second information is displayed on the information display interface, and the second information is information that is received by the first electronic device and that is sent by the second electronic device based on the first SIM card account; and a second identifier is displayed in a second area in which third information is displayed on the information display interface, and the third information is information that is received by the first electronic device and that is sent by the second electronic device based on the second SIM card account.

In this implementation, the first input may be a click operation, a pressing operation, a sliding operation, and the like for the target session, and is used to trigger switching to the information display interface of the target session.

On the information display interface of the target session, a first identifier is displayed in a first area of the information display interface for the information sent for the first SIM card account; and similarly, a second identifier is displayed in a second area of the information display interface for the information sent for the second SIM card account. The first identifier may be an account number of the first SIM card account, such as XX000000001; and the second identifier may also be an account number of the second SIM card account, such as XX000000002.

The first identifier may also include an information type, such as a short message, a multimedia message, or an instant messaging message.

Figure 2:
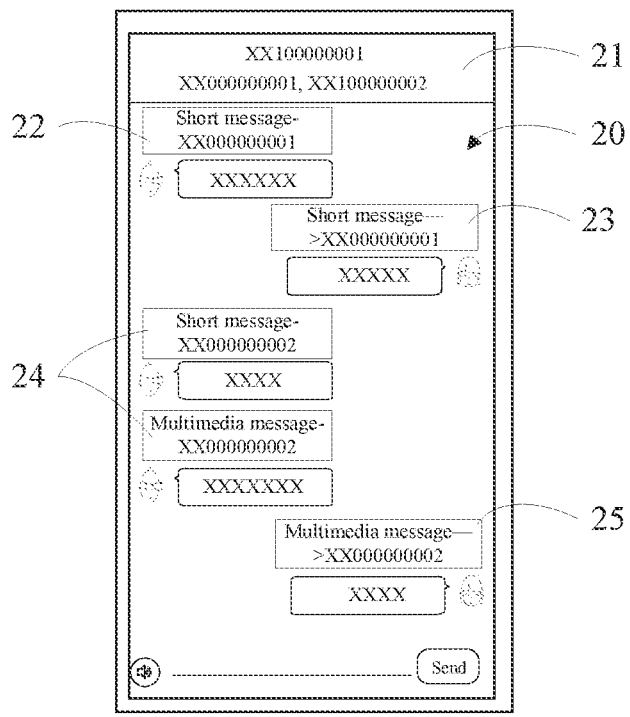
FIG. 2 is a schematic diagram of an information display interface of a target session according to an embodiment of the present invention.

As shown in FIG. 2, a session object box 21 is displayed at the top of the information display interface 20 of the target session, and the session object includes XX100000001 (Xiao Ming), XX000000001, and XX000000002. A sending account XX000000001 and a message type of the information are displayed in a first preset area 22 of the information sent by XX000000001; a sending account XX000000002 and a message type of the information are displayed in a second preset area 23 of the information sent by XX000000002; a reply object account XX000000001 and a message type are displayed in a third preset area 24 of the information that XX100000001 replies to XX000000001; and a reply object account XX000000002 and a message type are displayed in a fourth preset area 25 of the information that XX100000001 replies to XX000000002.

Moreover, in order to facilitate the user to identify an account for which the information was sent, a color may also be set for an information box. For example, information in a red information box represents information sent by the target SIM card account to the first SIM card account, and information in a blue information box represents information sent by the target SIM card account to the second SIM card account.

In this way, an object for sending the information may be effectively identified, and the effect for the user to view the information may further be improved.

Optionally, the displaying an information display interface of the target session includes: displaying the information display interface of the target session, and displaying switch controls in a third area of the information display interface, where the switch controls include a first switch control and a second switch control; and after the displaying the information display interface of the target session, the method further includes:
  receiving a second input for a target switch control, where the target switch control is one of the first switch control and the second switch control; and
  switching to a target session interface corresponding to the target switch control in response to the second input, where
  the target session interface is a session interface from a first sub-session and a second sub-session, and session objects of the first sub-session include the first SIM card account and the target SIM card account, and session objects of the second sub-session include the second SIM card account and the target SIM card account.

In this implementation, the switch controls are displayed on the information display interface, and the controls are used to switch the content of the session. For example, when the user wants to view session records of the first SIM card account and the target SIM card account, it is switched to a session interface of the first sub-session; when the user wants to view session records of the second SIM card account and the target SIM card account, it is switched to a session interface of the second sub-session; and in addition, when the user wants to view all session records, it may also be switched to the session interface of the target session. By setting in this way, an information viewing interface of the user may be optimized, and the information viewing effect may be improved.

Moreover, if the first electronic device includes a third SIM card account in addition to the target SIM card account, the third SIM card account may also be added to the session objects of the target session, thereby downplaying the concept of the SIM card account.

It should be noted that, in this embodiment, the second SIM card account and the third SIM card account may be a same SIM card account, or may be a group of SIM card accounts.

In the session information processing method of the embodiments of the present invention, the first electronic device receives first information sent by a second electronic device to a target SIM card account of the first electronic device based on a first SIM card account, where the first information carries identifier information of the second electronic device; and in a case that the first electronic device includes a second SIM card account associated with the identifier information, the first information is added to a target session, where a session object of the target session includes the first SIM card account, the second SIM card account, and the target SIM card account. In this way, the target SIM card account, the first SIM card account, and the second SIM card account are used to form a target session, and compared with that the target SIM card account is used to form sessions with each SIM card account associated with the identifier information of the second electronic device, a quantity of sessions of the first electronic device may be effectively reduced, and the effect for the user to view the information on the first electronic device is optimized.

Figure 3:
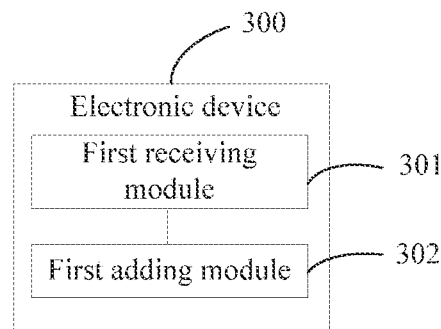
FIG. 3 is a first structural diagram of an electronic device according to an embodiment of the present invention.

As shown in FIG. 3, an embodiment of the present invention provides an electronic device, where the electronic device 300 is a first electronic device and includes:
  a first receiving module 301, configured to receive first information sent by a second electronic device to a target SIM card account of the first electronic device based on a first SIM card account, where the first information carries identifier information of the second electronic device; and
  a first adding module 302, configured to add, in a case that the first electronic device includes a second SIM card account associated with the identifier information, the first information to a target session, where session objects of the target session include the first SIM card account, the second SIM card account, and the target SIM card account.

Optionally, the first adding module 302 includes:
  a generating unit, configured to add, in a case that session records of the first electronic device include session records of the target SIM card account and the second SIM card account, the first SIM card account to the session records of the target SIM card account and the second SIM card account, so as to generate the target session; and an adding unit, configured to add the first information to the target session.

Optionally, the electronic device 300 further includes:
  a second receiving module, configured to receive a first input for the target session; and
  a first display module, configured to display an information display interface of the target session in response to the first input, where a first identifier is displayed in a first area in which second information is displayed on the information display interface, and the second information is information that is received by the first electronic device and that is sent by the second electronic device based on the first SIM card account; and a second identifier is displayed in a second area in which third information is displayed on the information display interface, and the third information is information that is received by the first electronic device and that is sent by the second electronic device based on the second SIM card account.

Optionally, the first display module is configured to: display the information display interface of the target session, and display switch controls in a third area of the information display interface, where the switch controls include a first switch control and a second switch control; and the electronic device 300 further includes:

a third receiving module, configured to receive a second input for target switch control, where the target switch control is one of the first switch control and the second switch control; and a second display module, configured to switch to a target session interface corresponding to the target switch control in response to the second input, where the target session interface is a session interface from a first sub-session and a second sub-session, and session objects of the first sub-session include the first SIM card account and the target SIM card account, and session objects of the second sub-session include the second SIM card account and the target SIM card account.

Optionally, the electronic device 300 further includes:

a second adding module, configured to add, in a case that the first electronic device includes a third SIM card account in addition to the target SIM card account, the third SIM card account to the session objects of the target session.

The electronic device 300 can implement the processes implemented by the first electronic device in the method embodiments in FIG. 1 and FIG. 2. To avoid repetition, details are not described herein again.

Figure 4:
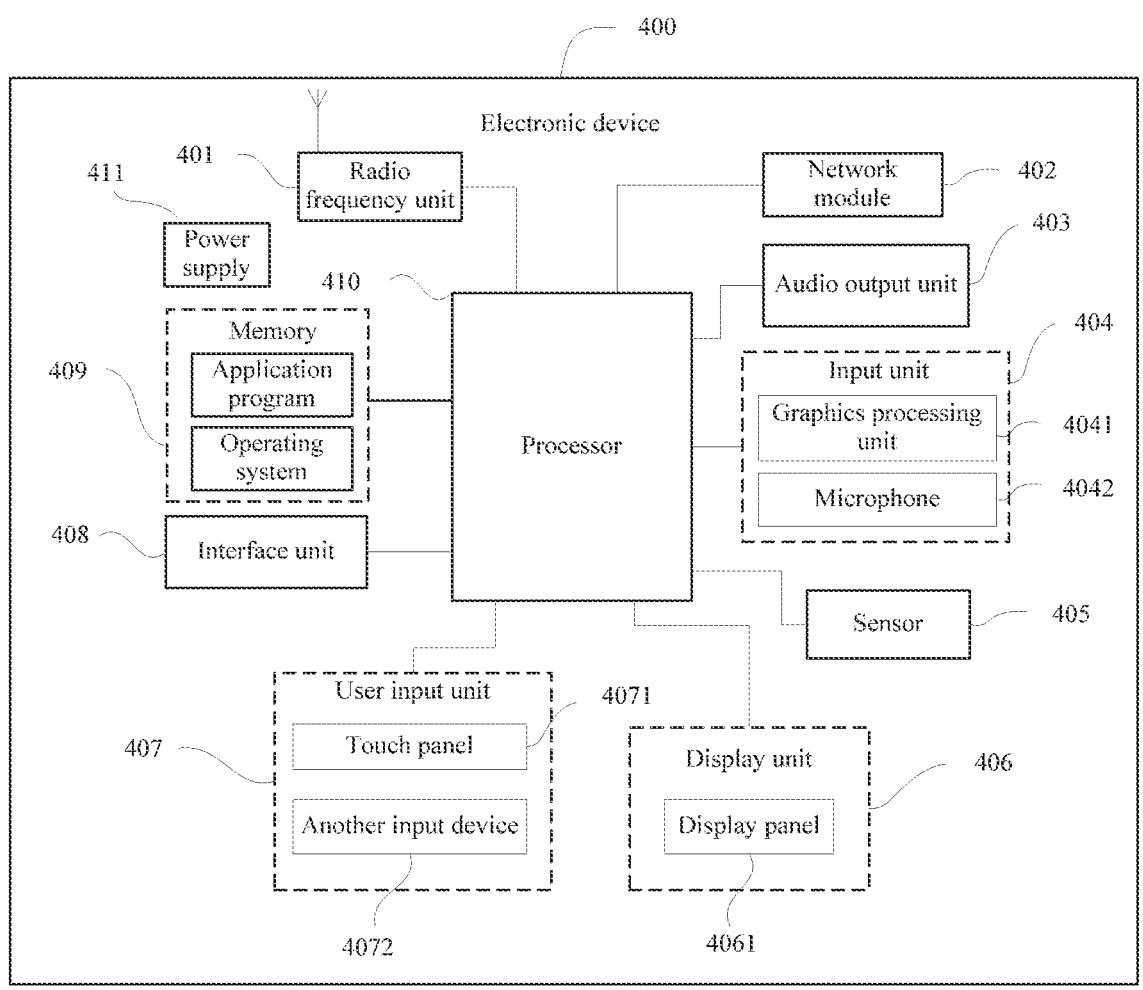
FIG. 4 is a second structural diagram of an electronic device according to an embodiment of the present invention.

As shown in FIG. 4, an embodiment of the present invention further provides an electronic device, where the electronic device 400 is a first electronic device and includes but is not limited to: a radio frequency unit 401, a network module 402, an audio output unit 403, an input unit 404, a sensor 405, a display unit 406, a user input unit 407, an interface unit 408, a memory 409, a processor 410, a power supply 411, and the like. A person skilled in the art may understand that a structure of the electronic device shown in FIG. 4 constitutes no limitation on the electronic device, and the electronic device may include more or fewer components than those shown in the figure, or have a combination of some components, or have a different component arrangement. In this embodiment of the present invention, the electronic device includes but is not limited to a mobile phone, a tablet computer, a notebook computer, a palmtop computer, an in-vehicle terminal, a wearable device, a pedometer, and the like.

The radio frequency unit 401 is configured to receive first information sent by a second electronic device to a target SIM card account of the first electronic device based on a first SIM card account, where the first information carries identifier information of the second electronic device; and the processor 410 is configured to add, in a case that the first electronic device includes a second SIM card account associated with the identifier information, the first information to a target session, where a session object of the target session includes the first SIM card account, the second SIM card account, and the target SIM card account.

Optionally, the processor 410 is configured to: add, in a case that session records of the first electronic device include session records of the target SIM card account and the second SIM card account, the first SIM card account to the session records of the target SIM card account and the second SIM card account, so as to generate the target session; and add the first information to the target session.

Optionally, the user input unit 407 is configured to receive a first input for the target session; and the display unit 406 is configured to display an information display interface of the target session in response to the first input, where a first identifier is displayed in a first area in which second information is displayed on the information display interface, and the second information is information that is received by the first electronic device and that is sent by the second electronic device based on the first SIM card account; and a second identifier is displayed in a second area in which third information is displayed on the information display interface, and the third information is information that is received by the first electronic device and that is sent by the second electronic device based on the second SIM card account.

Optionally, the display unit 406 is configured to: display the information display interface of the target session, and display switch controls in a third area of the information display interface, where the switch controls include a first switch control and a second switch control; the user input unit 407 is configured to receive a second input for a target switch control, where the target switch control is one of the first switch control and the second switch control; and the processor 410 is configured to switch to a target session interface corresponding to the target switch control in response to the second input, where the target session interface is a session interface from a first sub-session and a second sub-session, and session objects of the first sub-session include the first SIM card account and the target SIM card account, and session objects of the second sub-session include the second SIM card account and the target SIM card account.

Optionally, the processor 410 is configured to add, in a case that the first electronic device includes a third SIM card account in addition to the target SIM card account, the third SIM card account to the session objects of the target session.

The electronic device 400 can implement each process implemented by the first electronic device in the foregoing embodiments. To avoid repetition, details are not described herein again.

It should be understood that in this embodiment of the present invention, the radio frequency unit 401 may be configured to receive and transmit information, or receive and transmit signals during a call. For example, the radio frequency unit transmits downlink data to the processor 410 for processing after receiving the downlink data from a base station; and transmits uplink data to the base station. Usually, the radio frequency unit 401 includes but is not limited to an antenna, at least one amplifier, a transceiver, a coupler, a low noise amplifier, a duplexer, and the like. In addition, the radio frequency unit 401 may communicate with a network and another device through a wireless communication system.

The electronic device provides users with wireless broadband Internet access through the network module 402, for example, helps users receive and send e-mails, browse web pages, and access streaming media.

The audio output unit 403 may convert audio data received by the radio frequency unit 401 or the network module 402 or stored in the memory 409 into an audio signal and output the audio signal as a sound. In addition, the audio output unit 403 may further provide an audio output (for example, call signal receiving sound or message receiving sound) related to a specific function performed by the electronic device 400. The audio output unit 403 includes a loudspeaker, a buzzer, a telephone receiver, and the like.

The input unit 404 is configured to receive an audio signal or a video signal. The input unit 404 may include a graphics processing unit (GPU) 4041 and a microphone 4042. The graphics processing unit 4041 processes image data of a static image or video obtained by an image capture apparatus (for example, a camera) in a video capture mode or an image capture mode. A processed image frame may be displayed on the display unit 406. The image frame processed by the graphics processing unit 4041 may be stored in the memory 409 (or another storage medium) or sent by using the radio frequency unit 401 or the network module 402. The microphone 4042 may receive sound and can process such sound into audio data. The processed audio data may be converted in a call mode into a format that can be sent by the radio frequency unit 401 to a mobile communication base station for outputting.

The electronic device 400 further includes at least one sensor 405, for example, a light sensor, a motion sensor, and another sensor. The light sensor includes an ambient light sensor and a proximity sensor. The ambient light sensor may adjust luminance of the display panel 4061 based on brightness of ambient light. The proximity sensor may turn off the display panel 4061 and/or backlight when the electronic device 400 moves close to an ear. As a type of the motion sensor, an accelerometer sensor may detect an acceleration value in each direction (generally, three axes), and detect a value and a direction of gravity when the accelerometer sensor is static, and may be used for recognizing a posture of the electronic device (such as screen switching between landscape and portrait modes, a related game, or magnetometer posture calibration), a function related to vibration recognition (such as a pedometer or a knock), and the like. The sensor 405 may further include a fingerprint sensor, a pressure sensor, an iris sensor, a molecular sensor, a gyroscope, a barometer, a hygrometer, a thermometer, an infrared sensor, and the like. Details are not described herein.

The display unit 406 is configured to display information input by a user or information provided for a user. The display unit 406 may include a display panel 4061, and the display panel 4061 may be configured in a form of a liquid crystal display (LCD), an organic light-emitting diode (OLED), or the like.

The user input unit 407 may be configured to: receive input digital or character information, and generate key signal input related to a user setting and function control of the electronic device. The user input unit 407 includes a touch panel 4071 and another input device 4072. The touch panel 4071 is also referred to as a touchscreen, and may collect a touch operation performed by a user on or near the touch panel 4071 (for example, an operation performed by a user on the touch panel 4071 or near the touch panel 4071 by using any proper object or accessory, for example, a finger or a stylus). The touch panel 4071 may include two parts: a touch detection apparatus and a touch controller. The touch detection apparatus detects a touch position of the user, detects a signal brought by the touch operation, and sends the signal to the touch controller. The touch controller receives touch information from the touch detection apparatus, converts the touch information into touch point coordinates, sends the touch point coordinates to the processor 410, and receives and executes a command sent by the processor 410. In addition, the touch panel 4071 may be implemented in various types such as a resistor, a capacitor, an infrared ray, or a surface acoustic wave. The user input unit 407 may include other input devices 4072 in addition to the touch panel 4071. The another input device 4072 may include but is not limited to: a physical keyboard, function keys (for example, a volume control key and an on/off key), a trackball, a mouse, or a joystick. Details are not described herein.

Optionally, the touch panel 4071 may cover the display panel 4061. When detecting the touch operation on or near the touch panel 4071, the touch panel 4071 transmits the touch operation to the processor 410 to determine a type of a touch event, and then the processor 410 provides corresponding visual output on the display panel 4061 based on the type of the touch event. Although in FIG. 4, the touch panel 4071 and the display panel 4061 are configured as two independent components to implement input and output functions of the electronic device, in some embodiments, the touch panel 4071 and the display panel 4061 can be integrated to implement the input and output functions of the electronic device. Details are not limited herein.

The interface unit 408 is an interface for connecting an external apparatus with the electronic device 400. For example, the external apparatus may include a wired or wireless headset port, an external power supply (or battery charger) port, a wired or wireless data port, a storage card port, a port configured to connect to an apparatus having an identification module, an audio input/output (I/O) port, a video I/O port, a headset port, and the like. The interface unit 408 may be configured to receive an input (for example, data information and power) from an external apparatus and transmit the received input to one or more elements in the electronic device 400 or may be configured to transmit data between the electronic device 400 and the external apparatus.

The memory 409 may be configured to store a software program and various data. The memory 409 may mainly include a program storage area and a data storage area. The program storage area may store an operating system, an application required by at least one function (for example, a sound play function or an image display function), and the like. The data storage area may store data (for example, audio data or an address book) or the like created based on use of a mobile phone. In addition, the memory 409 may include a high-speed random access memory, and may further include a nonvolatile memory, for example, at least one magnetic disk storage device, a flash storage device, or another volatile solid-state storage device.

The processor 410 is a control center of the electronic device, connects all parts of the entire electronic device by using various interfaces and lines, and performs various functions of the electronic device and data processing by running or executing a software program and/or a module that are/is stored in the memory 409 and by invoking data stored in the memory 409, to overall monitor the electronic device. The processor 410 may include one or more processing units. Preferably, the processor 410 may be integrated with an application processor and a modem processor. The application processor mainly processes an operating system, a user interface, an application program, and the like. The modem processor mainly processes wireless communication. It can be understood that, alternatively, the modem processor may not be integrated into the processor 410.

The electronic device 400 may further include the power supply 411 (for example, a battery) supplying power to each component. Preferably, the power supply 411 may be logically connected to the processor 410 by using a power management system, so as to implement functions such as charging management, discharging management, and power consumption management by using the power management system.

In addition, the electronic device 400 includes some function modules not shown. Details are not described herein.

Preferably, an embodiment of the present invention further provides an electronic device, where the electronic device is a first electronic device and includes a processor 410, a memory 409, and a computer program stored in the memory 409 and executable on the processor 410. The computer program implements, when executed by the processor 410, the foregoing processes of the embodiment of the session information processing method, and a same technical effect can be achieved. To avoid repetition, details are not described herein again.

An embodiment of the present invention further provides a non-transitory computer-readable storage medium. The non-transitory computer-readable storage medium stores a computer program. The computer program implements, when executed by a processor, the foregoing processes of the embodiment of the session information processing method, and a same technical effect can be achieved. To avoid repetition, details are not described herein again. The non-transitory computer-readable storage medium includes a read-only memory (ROM), a random access memory (RAM), a magnetic disk, an optical disc, or the like.

It should be noted that, in this specification, the terms "include", "comprise", or their any other variant is intended to cover a non-exclusive inclusion, so that a process, a method, an article, or an apparatus that includes a list of elements not only includes those elements but also includes other elements which are not expressly listed, or further includes elements inherent to such process, method, article, or apparatus. In the absence of more restrictions, an element defined by the statement "including a . . . " does not preclude the presence of other identical elements in the process, method, article, or apparatus that includes the element.

Based on the descriptions of the foregoing implementation manners, a person skilled in the art may clearly understand that the foregoing method embodiments may be implemented by software in addition to a necessary universal hardware platform or by hardware only. In most circumstances, the former is a preferred implementation manner. Based on such an understanding, the technical solutions of the present invention essentially or the part contributing to existing technologies may be implemented in a form of a software product. The computer software product is stored in a storage medium (such as a ROM/RAM, a magnetic disk, or an optical disc) and includes several instructions for instructing a terminal (which may be a mobile phone, a computer, a server, an air conditioner, or a network device) to execute the methods described in the embodiments of the present invention.

The embodiments of the present invention are described above with reference to the accompanying drawings, but the present invention is not limited to the foregoing specific implementations. The foregoing specific implementations are merely exemplary instead of restrictive. Under enlightenment of the present invention, a person of ordinary skill in the art may make many forms without departing from the objective of the present invention and the protection scope of claims, all of which fall within the protection of the present invention.

What is claimed is:

1. A session information processing method, applied to a first electronic device and comprising:
    receiving first information sent by a second electronic device to a target subscriber identity module (SIM) card account of the first electronic device based on a first SIM card account, wherein the first information carries identifier information of the second electronic device; and
    in a case that the first electronic device comprises a second SIM card account associated with the identifier information, adding the first information to a target session, wherein session objects of the target session comprise the first SIM card account, the second SIM card account, and the target SIM card account,
    wherein after the adding the first information to the target session, the method further comprises:
    receiving a first input for the target session; and
    displaying an information display interface of the target session in response to the first input, wherein
    a first identifier is displayed in a first area in which second information is displayed on the information display interface, and the second information is information that is received by the first electronic device and that is sent by the second electronic device based on the first SIM card account, and
    a second identifier is displayed in a second area in which third information is displayed on the information display interface, and the third information is information that is received by the first electronic device and that is sent by the second electronic device based on the second SIM card account,
    wherein a unique matching relationship is established between a SIM card account and identifier information of an electronic device into which a SIM card is inserted.

2. The session information processing method according to claim 1, wherein the adding the first information to the target session comprises:
    in a case that session records of the first electronic device comprise session records of the target SIM card account and the second SIM card account, adding the first SIM card account to the session records of the target SIM card account and the second SIM card account, so as to generate the target session; and
    adding the first information to the target session.

3. The session information processing method according to claim 1, wherein the displaying the information display interface of the target session comprises:
    displaying the information display interface of the target session, and displaying switch controls in a third area of the information display interface, wherein the switch controls comprise a first switch control and a second switch control; and
    after the displaying the information display interface of the target session, the method further comprises:
    receiving a second input for a target switch control, wherein the target switch control is one of the first switch control and the second switch control; and
    switching to a target session interface corresponding to the target switch control in response to the second input, wherein the target session interface is a session interface from a first sub-session and a second sub-session, and session objects of the first sub-session comprise the first SIM card account and the target SIM card account, and session objects of the second sub-session comprise the second SIM card account and the target SIM card account.

4. The session information processing method according to claim 1, wherein after the adding the first information to the target session, the method further comprises:
in a case that the first electronic device comprises a third SIM card account in addition to the target SIM card account, adding the third SIM card account to the session objects of the target session.

5. An electronic device, wherein the electronic device is a first electronic device, and the electronic device comprises a processor, a memory, and a computer program stored in the memory and executable on the processor, and the computer program, when executed by the processor, causes the electronic device to perform:
receiving first information sent by a second electronic device to a target subscriber identity module (SIM) card account of the first electronic device based on a first SIM card account, wherein the first information carries identifier information of the second electronic device; and
in a case that the first electronic device comprises a second SIM card account associated with the identifier information, adding the first information to a target session, wherein session objects of the target session comprise the first SIM card account, the second SIM card account, and the target SIM card account,
wherein the computer program, when executed by the processor, causes the electronic device to further perform:
receiving a first input for the target session; and
displaying an information display interface of the target session in response to the first input, wherein
a first identifier is displayed in a first area in which second information is displayed on the information display interface, and the second information is information that is received by the first electronic device and that is sent by the second electronic device based on the first SIM card account; and a second identifier is displayed in a second area in which third information is displayed on the information display interface, and the third information is information that is received by the first electronic device and that is sent by the second electronic device based on the second SIM card account, and
wherein a unique matching relationship is established between a SIM card account and identifier information of an electronic device into which a SIM card is inserted.

6. The electronic device according to claim 5, wherein the computer program, when executed by the processor, causes the electronic device to perform:
in a case that session records of the first electronic device comprise session records of the target SIM card account and the second SIM card account, adding the first SIM card account to the session records of the target SIM card account and the second SIM card account, so as to generate the target session; and adding the first information to the target session.

7. The electronic device according to claim 5, wherein the computer program, when executed by the processor, causes the electronic device to perform:

displaying the information display interface of the target session, and displaying switch controls in a third area of the information display interface, wherein the switch controls comprise a first switch control and a second switch control; and
the computer program, when executed by the processor, causes the electronic device to further perform:
receiving a second input for a target switch control, wherein the target switch control is one of the first switch control and the second switch control; and
switching to a target session interface corresponding to the target switch control in response to the second input, wherein
the target session interface is a session interface from a first sub-session and a second sub-session, and session objects of the first sub-session comprise the first SIM card account and the target SIM card account, and session objects of the second sub-session comprise the second SIM card account and the target SIM card account.

8. The electronic device according to claim 5, wherein the computer program, when executed by the processor, causes the electronic device to further perform:
in a case that the first electronic device comprises a third SIM card account in addition to the target SIM card account, adding the third SIM card account to the session objects of the target session.

9. A non-transitory computer-readable storage medium, wherein the non-transitory computer-readable storage medium stores a computer program, and the computer program, when executed by a processor of an electronic device, causes the electronic device to perform:
receiving first information sent by a second electronic device to a target subscriber identity module (SIM) card account of the first electronic device based on a first SIM card account, wherein the first information carries identifier information of the second electronic device; and
in a case that the first electronic device comprises a second SIM card account associated with the identifier information, adding the first information to a target session, wherein session objects of the target session comprise the first SIM card account, the second SIM card account, and the target SIM card account,
wherein the computer program, when executed by the processor, causes the electronic device to further perform:
receiving a first input for the target session; and
displaying an information display interface of the target session in response to the first input, wherein
a first identifier is displayed in a first area in which second information is displayed on the information display interface, and the second information is information that is received by the first electronic device and that is sent by the second electronic device based on the first SIM card account; and a second identifier is displayed in a second area in which third information is displayed on the information display interface, and the third information is information that is received by the first electronic device and that is sent by the second electronic device based on the second SIM card account; and
wherein a unique matching relationship is established between a SIM card account and identifier information of an electronic device into which a SIM card is inserted.

10. The non-transitory computer-readable storage medium according to claim 9, wherein the computer program, when executed by the processor, causes the electronic device to perform:

in a case that session records of the first electronic device comprise session records of the target SIM card account and the second SIM card account, adding the first SIM card account to the session records of the target SIM card account and the second SIM card account, so as to generate the target session; and adding the first information to the target session.

11. The non-transitory computer-readable storage medium according to claim 9, wherein the computer program, when executed by the processor, causes the electronic device to perform:

displaying the information display interface of the target session, and displaying switch controls in a third area of the information display interface, wherein the switch controls comprise a first switch control and a second switch control; and the computer program, when executed by the processor, causes the electronic device to further perform:

receiving a second input for a target switch control, wherein the target switch control is one of the first switch control and the second switch control; and switching to a target session interface corresponding to the target switch control in response to the second input, wherein the target session interface is a session interface from a first sub-session and a second sub-session, and session objects of the first sub-session comprise the first SIM card account and the target SIM card account, and session objects of the second sub-session comprise the second SIM card account and the target SIM card account.

12. The non-transitory computer-readable storage medium according to claim 9, wherein the computer program, when executed by the processor, causes the electronic device to further perform:

in a case that the first electronic device comprises a third SIM card account in addition to the target SIM card account, adding the third SIM card account to the session objects of the target session.

\* \* \* \* \*